April 8, 1969  O. RECIO ET AL  3,437,993
PASSENGER SEAT BELT SAFETY SYSTEM FOR AUTOMOTIVE VEHICLE
Filed Dec. 6, 1965  Sheet 1 of 2

DENNIS J. JONES
RICHARD A. HOLLOWAY
RONALD L. LANCASTER
GEORGE R. MOTLEY
ORLANDO RECIO,
  INVENTORS.

BY

Charles A. Phillips
ATTORNEY

April 8, 1969     O. RECIO ET AL     3,437,993
PASSENGER SEAT BELT SAFETY SYSTEM FOR AUTOMOTIVE VEHICLE
Filed Dec. 6, 1965     Sheet 2 of 2

DENNIS J. JONES
RICHARD A. HOLLOWAY
RONALD L. LANCASTER
GEORGE R. MOTLEY
ORLANDO RECIO,
*INVENTORS.*

BY
*Charles A. Phillips*
ATTORNEY.

United States Patent Office 3,437,993
Patented Apr. 8, 1969

3,437,993
PASSENGER SEAT BELT SAFETY SYSTEM
FOR AUTOMOTIVE VEHICLE
Orlando Recio, 2107 Basel Drive 35811; Richard A. Holloway, 215 Curtis Drive SE. 35803; Ronald L. Lancaster, 2811 Hester Lane NW. 35810; Dennis J. Jones, 315 Dell Ave. SE. 35802; and George R. Motley, 2727 A Clayton Drive 35810, all of Huntsville, Ala.
Filed Dec. 6, 1965, Ser. No. 511,905
Int. Cl. B60q 9/00
U.S. Cl. 340—53        6 Claims

ABSTRACT OF THE DISCLOSURE

A system for insuring that automobile seat belts are worn in which seat belts for any occupied seat must be fastened before the automobile can be started employing means for sensing when a seat is occupied and means for sensing when the seat belt for that particular seat is fastened.

This invention relates to safety devices and systems and particularly to safety devices and systems adapted for the protection of passengers in automotive vehicles.

The past few years have witnessed an increased awareness and concern for the ever increasing number of persons killed and injured as a result of automobile accidents. The automobile industry, responsive to the resulting public demand for safer vehicles has introduced a number of safety devices and systems in their late models. Probably the most significant safety feature introduced in recent years has been the safety belt which is fast becoming a standard item of automobile equipment. While this trend is rapidly making the safety belt available on a wide scale it is still a relatively new thing to many persons who tend to discount or simply ignore its advantages and who fail to use it even though it is available. In an effort to increase usage, at least one automobile maker has installed a special signal light which glows when the driver's seat belt is not fastened and the ignition of the vehicle is turned on. Another approach, generally illustrated in Patents 2,777,531, 3,133,277, 3,147,819, and 3,166,146 is to inter-lock the automobile ignition system with a seat belt switching system, as by completing a circuit when the seat belt is latched.

Despite the aforesaid efforts, it is believed that prior systems are still insufficient in meeting the problem of promoting maximum usage of safety belts and this is attested by the substantial numbers who still ignore them.

It is, accordingly, the object of the present invention to overcome the aforesaid difficulties and provide an improved safety system for an automotive vehicle with more effectiveness and convenience than prior systems in promoting the use of safety belts by all occupants of a vehicle, passengers as well as the driver.

In accordance with the invention the electrical starting circuit (as opposed to ignition system) of a vehicle is placed in circuit with a safety belt activated switching means associated with each safety belt of a vehicle and also switching means associated with each passenger seat position of the vehicle except the driver's seat. The switching means associated with each seat position is typically connected electrically in parallel with one of the safety belt switching means and it normally provides one electrical condition (open or closed) and the safety belt switching means normally provides the opposite electrical condition so that when both are operated they cancel one another in effect.

As an example the safety belt switch would be normally in an open circuit condition and the seat switch normally in a closed condition and thus these switches being in parallel with one another and together in series with the starting solenoid of an automobile the resulting circuit allows the uninterrupted operation of the starting circuit if both the seat switch and belt switch are not operated (where no passenger is present in that seat) or both of the switches are operated (as where a passenger operates the seat switch by being in the seat and operates a safety belt switch by fastening his safety belt). If the passenger had failed to fasten his belt both the seat switch and belt switch would have been open and the starting circuit would have been interrupted preventing starting of the vehicle.

Other objects, features and aspects of the invention will become apparent from the following description when considered in conjunction with the drawings in which.

Figure 1:
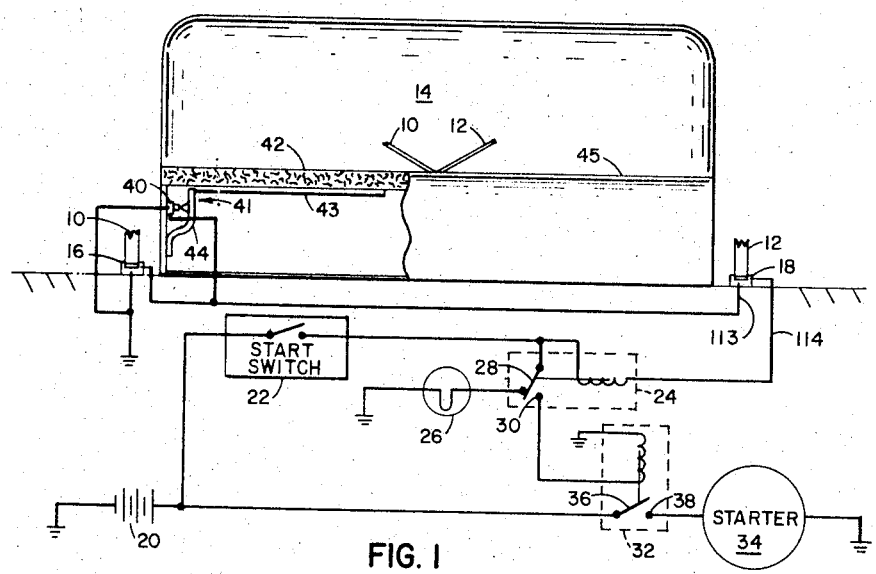
FIG. 1 is a diagrammatic illustration of an embodiment of the invention.

Referring to FIG. 1, seat belt assemblies 10 and 12, which are conventional except as otherwise noted, are shown associated with the front seat 14 of an automobile, not otherwise shown. A normally open switch 16, operated or closed by means of tension applied to passenger seat belt assembly 10 (as by passenger fastening taut the seat belt assembly), is electrically in series with a similar switch 18 associated with driver safety belt assembly 12 and these switches are connected in the starting circuit of the vehicle. As a feature of one aspect of the invention this circuit consists of battery 20, start switch 22 and current reduction relay 24. As a further feature of the invention the electrical circuit also includes "Seat Belt Unfastened" signal light 26, which is connected between the "normally connected" output contact 28 of relay 24 and ground, and which illuminates when switch 22 is closed and the seat switch-seat belt circuit is open between coil 24 and ground. With the seat belt-seat switch circuit loop closed, relay 24 is energized and output terminal 30 of relay 24 is powered to energize starter solenoid 32 which is connected between contact 30 and ground. Starter or starter motor 34 is energized from battery 20 through contacts 36 and 38 of relay or solenoid switch 32 when solenoid switch 32 is energized.

Normally closed seat switch 40 of seat switch assembly 41 which is associated with the passenger portion of front seat 14, is connected in parallel with normally open belt switch 16. Seat switch 40, a plunger type micro switch, is opened whenever an occupant or passenger sits on the passenger portion 42 of seat 14 by virtue of the pull on spring lever arm 44 by cable 43 hooked to the springs, not shown, of seat 14. Lever arm 44 then releases a depressed plunger, not shown, of switch 40 in response to the downward deflection of seat 14 as a passenger is seated. With switch 40 open relay 24 and the starting circuit cannot be engaged. Thus if start switch 22 is closed (and driver belt switch 18 is closed) open switch 40 would prevent the auto from starting until belt switch 16, in parallel with switch 40, is closed, as by a passenger fastening taut, his seat belt assembly. Since there would be no operation of the vehicle unless there was an occupant of the driver portion 45 of seat 14, it is unnecessary to provide a counter-part of switch 40 on the driver's side of seat 14. If, of course the driver fails to fasten seat belt assembly 12 to close switch 18, the starting circuit is interrupted whether or not the passenger circuit is open or closed. Thus any interruption of the circuit prevents starting. Such an interruption also causes "Seat Belt Unfastened" signal light 26 to be illuminated if switch 22 is closed in an attempt to start the auto.

Figure 2:
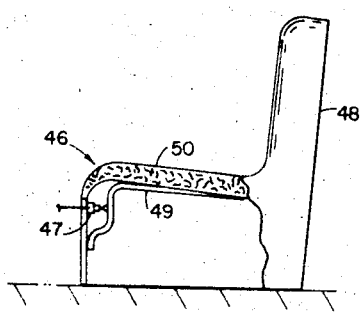
FIG. 2 is a diagrammatic illustration of a seat switch as constructed in accordance with the invention.

The seat switch assembly 46 in FIG. 2 differs from seat switch assembly 41 of FIG. 1 in that seat switch 47 is attached to the front portion of seat 48 and a curved leaf spring 49 extends from front to back of cushion 50 and operates switch plunger of switch 47 which is held closed by spring 49 until cushion 50 and spring 49 are deflected downward, as by a passenger being seated.

Figure 3:
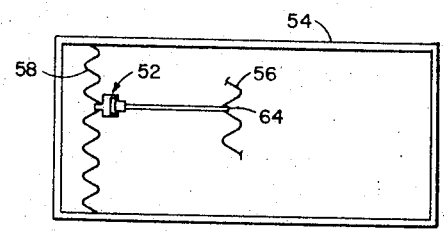
FIG. 3 is a bottom view of an alternate embodiment of a seat switch.
Figure 4:
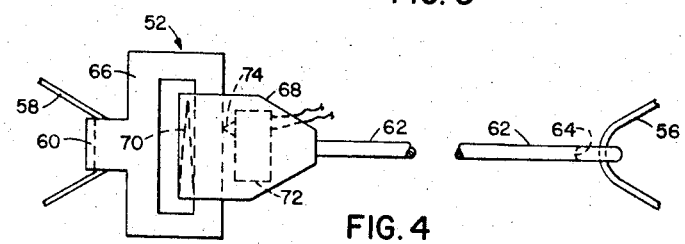
FIG. 4 is an enlarged view of portion of FIG. 3.

FIGS. 3 and 4 show still another embodiment of a seat switch, designated seat switch assembly 52, which is responsive to downward, passenger inflicted, deflection of a seat cushion, in this case cushion 54, to change from a normally closed circuit condition to an open circuit condition. Switch assembly 52 is suspended between spring members 56 and 58 of cushion 54 by means of hook 60 attached to one end of switch assembly 52 and to an arm or cable 62, having a hook 64 connected to the opposite end of switch assembly 52. Switch assembly 52, shown in greater detail in FIG. 4, consists of a clevis 66, switch mounting member 68, spring (or rubber) tension member 70, and plunger operated, normally open, switching unit 72, which by virtue of the tension applied by spring member 70 is converted in this application to a normally closed switch assembly. As will be noted plunger 74 of switching unit 72 is normally depressed, and thus operated to an open condition by tension exerted between hook 60 of clevis 66 and connecting cable 62. In this instance cable 62 provides a connecting linkage for varying the relative position of the body of switching unit 72 and its plunger 74 to effect switching action. The body of switching unit 72 is mounted to mounting member 68 which is U-shaped similar to illustrated U-shaped member 75 of FIGS. 12 and 13.

Figures 5, 6:
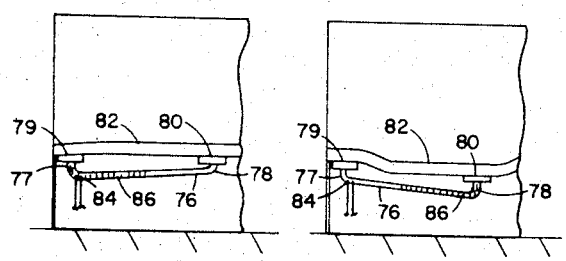
FIGS. 5 and 6 are diagrammatic illustrations of still another embodiment of a seat switch in unoperative and operative positions, respectively.

FIGS. 5 and 6 illustrate yet another embodiment of a novel switch assembly adapted to sense downward deflection of a car seat and thus the presence of an occupant. In this instance a flexible tubular member 76 is attached by means of supporting end members 77 and 78 at points 79 and 80 to the underside of seat cushion 82. Point 79 is at the edge of the seat and normally would not be substantially deflected downward and thus it is essentially a reference position at which electrical contacts 84 are placed within flexible tubular member 76. A conductive fluid 86 partially fills flexible tubular member 76 and when point 80 is not deflected, as shown in FIG. 5 the fluid closes contacts 84 to indicate that no one is occupying seat cushion 82 and thus no interruption of the circuit shown in FIG. 1 would occur. If, however seat cushion 82 is deflected downward, as shown in FIG. 6, fluid 86 would flow downward to the right, thus opening contacts 84, causing interruption in this circuit and making it necessary that the circuit be completed by virtue of seat belt switch 16 (as shown in FIG. 1) before the automobile could be started.

Figure 7:
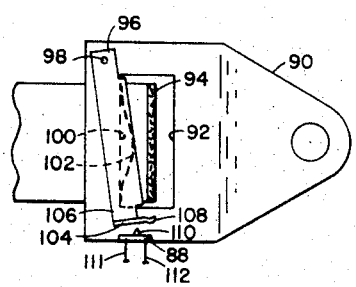
FIG. 7 is a top view of a safety belt switch in an unoperated mode.
Figure 8:
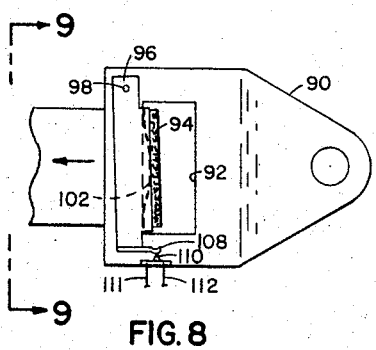
FIG. 8 is a top view of the safety belt switch shown in FIG. 7 in an operated mode.
Figure 9:
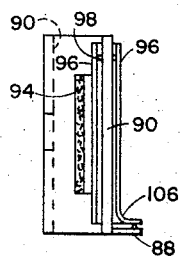
FIG. 9 is an end view, partly in section, of FIG. 8.

FIGS. 7, 8 and 9 illustrate a tension switch suitable for employment as switch 16 or 18 of FIG. 1 to provide safety belt activated switching of switch 16 or 18 to a closed position when tension is applied. As shown, a normally open plunger type micro switch 88 is mounted on clevis 90, having a central opening 92 through which a portion of safety belt 94 is threaded and forms a permanently sewn loop through 92. Belt 94 will exert pressure against U-channel-shaped lever 96 upon the application of tension to belt 94 and with U-channel lever 96 pivoted at one end 98, this tension would force the variable enclosure of a portion of edge 100 of opening 92 as the tension applied overcomes the force of leaf spring 102. As this occurs, switch contact arm 104, attached to the opposite end 106 of U-channel lever 96 and having a cam 108 at one end, causes plunger 110 of switch 88 to be depressed closing the electrical circuit appearing across terminals 111 and 112 of switch 88 and corresponding for example, to terminal points 113 and 114 of switch 18 of FIG. 1. FIGS. 8 and 9 illustrate the tension switching means of the switching assembly of FIG. 7 when tension on belt portion 94 has produced a closing of switch 88.

Figure 10:
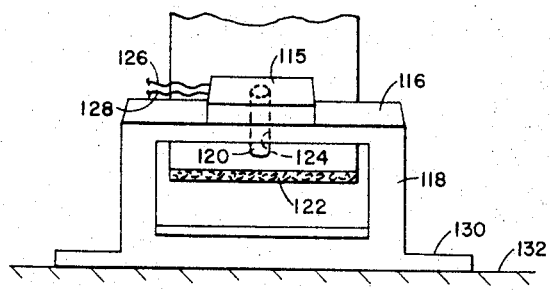
FIG. 10 is a perspective view of another embodiment of a safety belt switch.
Figure 11:
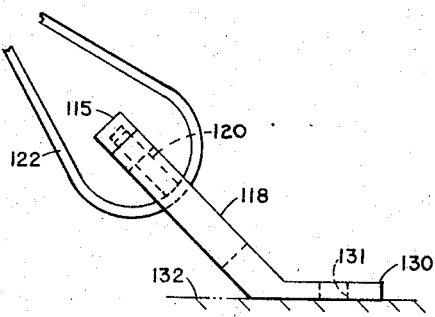
FIG. 11 is an end view partly in section of the safety belt switch shown in FIG. 10.

FIGS. 10 and 11 illustrate still another embodiment of safety belt tension switch and wherein a normally open plunger type micro switch 115 is mounted on the outer edge 116 of clevis 118 with plunger 120 of switch 115 being exposed to safety belt 122 through an opening 124 in edge 116 of clevis 118. Upon the application of tension to belt 122, plunger 120 will be depressed causing switch 115 to shift from a normally open mode to a closed electrical circuit mode as electrically presented at terminals 126 and 128 of switch 115. Typically the base 130 of clevis 118 would be attached by means of a bolt through bolt hole 131 to the floor 132 of the vehicle with which it is employed as would generally be the case of the clevis members shown in FIGS. 7, 8, 9, 12, and 13 as well.

Figure 12:
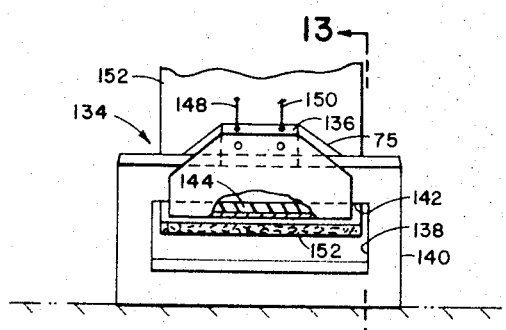
FIG. 12 shows a perspective view of still another belt or tension switch.
Figure 13:
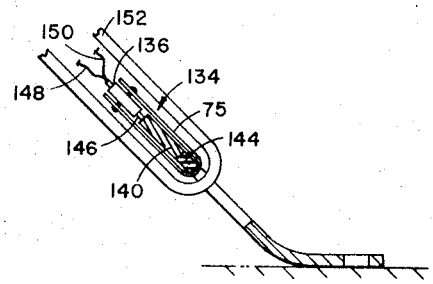
FIG. 13 is an end view, partly in section of the switch shown in FIG. 12.

FIGS. 12 and 13 show still another embodiment of a tension operated seat belt switch and wherein a normally open switch assembly 134 consists of a normally closed plunger operated switch 136 mounted at the two extreme ends of the U-shaped member 75. U-shaped member 75 is positioned through opening 138 of clevis 140 and is restrained away from edge 142 of clevis 140 by virtue of rubber spring means 144 which has the effect of holding plunger 146 of switch 136 in an operated or open mode, as reflected at terminals 148 and 150 unless and until tension is exerted between clevis 140 and safety belt 152, a portion of which surrounds U-shaped member 75. The particular advantage of the switch shown in FIGS. 12 and 13 is that working tension does not react against the switch, which is a factor in reducing switch wear, but actually releases the plunger of the switch instead.

Referring again to FIG. 1 the operation of the system is as follows. With a single occupant of the vehicle, the driver seated in the driver's portion 45 of seat 14, the automobile can be started when and only when safety belt assembly 12 is under tension, indicating that it is providing fastened tension on tension switch 18 and thus permitting the electrical circuit to be closed through battery 20, start switch 22, relay isolation or current reduction relay 24 and seat switch 40 to ground. The result is that relay 24 will be operated immediately to contact position 30, and thus "Seat Belt Unfastened" light 26 will not be lit and instead starting motor solenoid 32 will be operated causing starter motor 34 to crank the vehicle. Isolation relay 24 thus not only provides means for isolation of control currents in order that the switches associated with seat 14 and safety belt assemblies 10 and 12 need not carry the full current necessary to operate starter solenoid 32, it also provides a means of controlling in an ideal fashion the "Seat Belt Unfastened" light 26. If there had been an open circuit due to the driver's seat belt being unfastened and/or due to a passenger having an unfastened safety belt, relay 24 would not have been operated but the power through the start switch would have caused light 26 to light indicating the fact of a driver's seat belt and/or a passenger's seat belt remaining unfastened when the passenger's seat was occupied. It is to be noted that once the engine has been started the fact that one unfastens his safety belt would not cause the engine of the car to be stopped as is the case in some of the prior art cited above wherein the safety circuit is in the ignition rather than the starting circuit.

In the event that a passenger occupies any seat in the vehicle, front or back, wherein a seat switch 40 and safety belt switch 16 is provided it will be observed that switch 40 will be caused to provide an open circuit, and thus the circuit described above will be opened and the vehicle will not start. This is remedied, of course, when tension is supplied to the safety belt assembly 10 associated with that seat as when the seat belt is firmly closed about the passenger in which case normally open switch 16 would close the circuit permitting power to be applied to solenoid 24.

While a conventional safety belt is contemplated for safety belt assemblies 10 and 12 it is to be understood that any type of restraining harness wherein tension would be applied would be effective to operate the switches 16 and 18. In addition other types of seat belt responsive switches may be employed to close the circuit shown in FIG. 1 to perform the same logical function in the system. It is to be appreciated that although the seat type switches shown are illustrated as being under the cushion of the seat, deflection sensing switches may also be placed in the back rest portion of the seat instead, in order to sense the presence of an occupant.

It is believed that the present invention provides means whereby safety belts will be more widely employed as the system essentially does the remembering for the occupants of a vehicle. This system is substantially foolproof and lends itself to either "built-in" installations or "add-to" installations as it is readily adaptable to vehicles having either no seat belt installations or having seat belt installations but lacking the switching means illustrated herein. Further, the system may be employed with any number of passenger positions whether it be a single seat vehicle a two seat vehicle or more and, of course, may be employed in any type passenger vehicle.

It is to be appreciated that many changes may be made in the details of construction of the system and devices set forth herein without departing from the true scope of the invention as defined by the appended claims.

What we claim as new and desire to protect by Letter Patent is:

1. A safety system for an automotive vehicle comprising:
   (A) safety belt assembly means adapted to be used in conjunction with the vehicular seat of an automotive vehicle for restraining an occupant seated therein and including a belt member;
   (B) belt switching means associated with said safety belt assembly means for presenting a first electrical circuit condition when said belt switching means is in an operative mode and a second electrical circuit condition when said belt switching means is not in an operative mode and said belt switching means is mechanically in circuit with said belt member and comprises tension switching means responsive to tension applied to said belt member for presenting a said first electrical circuit condition and responsive to a lack of tension in said belt member for providing a said second electrical circuit condition and wherein said tension switching means comprises:
      (1) a belt supporting clevis having an opening to accommodate a portion of said belt member looped through said opening;
      (2) a relatively flat U-shaped member positioned within said opening of said clevis and substantially enclosed by said belt portion;
      (3) spring bias means positioned between the central portion of said U-shaped member and said clevis;
      (4) a normally closed switch, the body of said switch being mounted between the leg members of said U-shaped member, and having a depressible operative member engaging said clevis and held in a switch "open" condition by force exerted by said spring bias means in the absence of a counteracting belt tension and in a a "closed" condition when force from said spring bias is relieved by virtue of counteracting belt tension applied between said clevis and said belt portion;
   (C) seat switching means associated with a said vehicular seat and including means responsive to the presence of an occupant of said seat for presenting a first electrical circuit condition when said seat is not occupied and a second electrical circuit condition when said seat is occupied; and
   (D) electrical circuit means in circuit with the electrical starting means of the said automotive vehicle and said belt and seat switching means for completing an electrical circuit energizing said electrical starting means responsive to a said first electrical circuit condition of said belt switching means or said seat switching means.

2. A safety system for an automotive vehicle comprising:
   (A) safety belt assembly means adapted to be used in conjunction with the vehicular seat of an automotive vehicle for restraining an occupant seated therein and including a belt member;
   (B) belt switching means associated with said safety belt assembly means for presenting a first electrical circuit condition when said belt switching means is in an operative mode and a second electrical circuit condition when said belt switching means is not in an operative mode and said belt switching means is mechanically in circuit with said belt member and comprises tension switching means responsive to tension applied to said belt member for presenting a said electrical circuit condition and responsive to a lack of tension in said belt member for providing a said second electrical circuit condition and wherein said tension switching means comprises:
      (1) a belt supporting clevis having an opening adapted to accommodate a portion of said belt member looped through said opening;
      (2) normally "open" switching means associated with said belt supporting clevis and responsive to tension applied to that portion of said belt member looped through said belt supporting clevis for providing said second electrical circuit condition when said portion of said belt member is not under tension and provide said first electrical circuit condition when said belt portion is under tension;
   (C) seat switching means associated with a said vehicular seat and including means responsive to the presence of an occupant of said seat for presenting a first electrical circuit condition when said seat is not occupied and a second electrical circuit condition when said seat is occupied; and
   (D) electrical circuit means in circuit with the electrical starting means of the said automotive vehicle and said belt and seat switching means for completing an electrical circuit energizing said electrical starting means responsive to a said first electrical circuit condition of said belt switching means or said seat switching means.

3. A safety system for an automotive vehicle as set forth in claim 2 wherein said tension switching means comprises means contacting said portion of said belt member and said clevis for sensing relative movement between said clevis and said belt portion.

4. The safety system for an automotive vehicle as set forth in claim 3 wherein said tension switching means is a normally "open" plunger operated switch mounted on said clevis and wherein said plunger is exposed to said belt member through an opening extending through an edge portion of said opening.

5. A safety system for an automotive vehicle comprising:
(A) safety belt assembly means adapted to be used in conjunction with a vehicular seat of an automotive vehicle for restraining an occupant seated therein;
(B) belt switching means associated with said safety belt assembly means for presenting a first electrical circuit condition when said belt switching means is in an operative mode and a second electrical circuit condition when said belt switching means is not in an operative mode;
(C) seat switching means associated with a said vehicular seat and including means responsive to the presence of an occupant of said seat for presenting a first electrical circuit condition when said seat is not occupied and a second electrical circuit condition when said seat is occupied;
(D) electrical circuit means in circuit with the electrical starting means of the said automotive vehicle and said belt and seat switching means for completing an electrical circuit energizing said electrical starting means responsive to a said first electrical circuit condition of said belt switching means or said seat switching means;
(E) relay means in circuit between said starting means and said belt switching means and responsive to said belt switching means and said seat switching means for completing a circuit between said starting means and the battery of said vehicle and wherein said relay means comprises a solenoid coil, a movable contact, a first fixed contact in circuit with said movable contact when said solenoid coil is energized and a second fixed contact in circuit with said movable contact when said coil is unenergized;
(F) an electrically powered signal means; and
(G) wherein:
(1) one terminal of said solenoid coil is connected to said movable contact and through a starting control switch to an ungrounded vehicle battery lead,
(2) the other terminal of said solenoid coil is connected through said belt switching means and said seat switching means to a grounded lead of said battery,
(3) said starting means comprises a starting motor and starting solenoid coil and said starting solenoid coil is connected between said first fixed contact and a said grounded battery lead, and
(4) said signal means is connected between said second fixed contact and a said grounded battery lead.

6. A safety system for an automotive vehicle comprising:

(A) safety belt assembly means adapted to be used in conjunction with a vehicular seat of an automotive vehicle for restraining an occupant seated therein;
(B) belt switching means associated with said safety belt assembly means for presenting a first electrical circuit condition when said belt switching means is in an operative mode and a second electrical circuit condition when said belt switching means is not in an operative mode;
(C) seat switching means associated with a said vehicular seat and including means responsive to the depression of said seat for presenting a first electrical circuit condition when said seat is not occupied and a second electrical circuit condition when said seat is occupied and comprising:
(1) a normally "closed" electrical switch having first and second relatively movable portions and adapted to be operated to an "open" condition when said portions are relatively moved;
(2) means for connecting said first portion of said switch to a first point on said vehicle and means, including connecting linkage, for connecting said second portion of said switch to a second and separated point on said vehicle and said second and separated point is a point on the underside of a said seat of said vehicle, and wherein said normally "closed" electrical switch is operated to an "open" condition by tension exerted on said first and second relatively movable portions of said switch by said connecting linkage;
(D) electrical circuit means in circuit with the electrical starting means of the said automotive vehicle and said belt and seat switching means for completing an electrical circuit energizing said electrical starting means responsive to a said first electrical circuit condition of said belt switching means or said seat switching means.

References Cited

UNITED STATES PATENTS

| 2,868,309 | 1/1959 | Burgess | 180—82 |
| 3,185,246 | 5/1965 | Maurer | 180—82 |
| 3,215,221 | 11/1965 | Rayman | 180—82 |
| 3,226,674 | 12/1965 | Eriksson | 180—82 |
| 1,878,596 | 9/1932 | Papaefthemeou | 340—68 |
| 2,876,856 | 3/1959 | Greene | 180—82 |
| 3,200,370 | 8/1965 | Rush | 340—278 |
| 3,237,710 | 3/1966 | MacDonald | 180—82 |

KENNETH H. BETTS, Primary Examiner.

U.S. Cl. X.R.

180—82, 101; 200—61.58; 340—278